US012580792B2

(12) United States Patent
Kim et al.

(10) Patent No.: US 12,580,792 B2
(45) Date of Patent: Mar. 17, 2026

(54) TRANSMISSION POWER CONTROL METHOD AND ELECTRONIC DEVICE FOR PERFORMING THE SAME

(71) Applicant: Samsung Electronics Co., Ltd., Suwon-si (KR)

(72) Inventors: Dohun Kim, Suwon-si (KR); Kyujae Jang, Suwon-si (KR); Jaemoon Cha, Suwon-si (KR); Jimin Koo, Suwon-si (KR); Jaegon Ghim, Suwon-si (KR); Jungsuk Woo, Suwon-si (KR); Yeonsang Yun, Suwon-si (KR); Kwangsu Lee, Suwon-si (KR); Deokhee Lee, Suwon-si (KR); Sangdon Lee, Suwon-si (KR); Yeonjoo Lee, Suwon-si (KR); Sanghyun Chang, Suwon-si (KR); Sungyoul Cho, Suwon-si (KR); Hyunkyung Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 18/629,184

(22) Filed: Apr. 8, 2024

(65) Prior Publication Data
US 2024/0275638 A1 Aug. 15, 2024

Related U.S. Application Data

(63) Continuation of application No. PCT/KR2022/017261, filed on Nov. 4, 2022.

(30) Foreign Application Priority Data

Nov. 11, 2021 (KR) ........................ 10-2021-0155052

(51) Int. Cl.
*H04L 25/02* (2006.01)
*H04L 5/00* (2006.01)

(52) U.S. Cl.
CPC ........ *H04L 25/0204* (2013.01); *H04L 5/0023* (2013.01); *H04L 5/0048* (2013.01)

(58) Field of Classification Search
CPC .. H04L 5/0023; H04L 25/0204; H04L 5/0048
See application file for complete search history.

(56) References Cited

U.S. PATENT DOCUMENTS

| | | | |
|---|---|---|---|
| 10,652,833 B2 | 5/2020 | Nadakuduti et al. | |
| 10,924,146 B2 | 2/2021 | Kaidar et al. | |

(Continued)

FOREIGN PATENT DOCUMENTS

| | | |
|---|---|---|
| KR | 20140128096 A | 11/2014 |
| KR | 101783609 B1 | 11/2017 |

(Continued)

OTHER PUBLICATIONS

International Search Report for PCT/KR2022/017261 mailed Jan. 27, 2023, 5 pages.

(Continued)

*Primary Examiner* — Rahel Guarino
(74) *Attorney, Agent, or Firm* — Nixon & Vanderhye P.C.

(57) ABSTRACT

Disclosed are a transmission power control method and an electronic device for performing the same. The transmission power control method according to various embodiments may comprise: determining whether the magnitude of a reference signal received from a first base station for transmitting and receiving a first signal is greater than or equal to a set magnitude; determining a ratio of a specific absorption rate of the first signal according to a ratio set in the total (Continued)

specific absorption rate margin; and transmitting the first signal on the basis of the ratio of the specific absorption rate of the first signal.

15 Claims, 12 Drawing Sheets

(56)　　　　　　References Cited

U.S. PATENT DOCUMENTS

| | | | |
|---|---|---|---|
| 2017/0265148 A1* | 9/2017 | Balasubramanian | ........................ H04W 52/248 |
| 2019/0349017 A1 | 11/2019 | Kaidar et al. | |
| 2020/0015171 A1 | 1/2020 | Nadakuduti et al. | |
| 2021/0144652 A1 | 5/2021 | Gheorghiu et al. | |

FOREIGN PATENT DOCUMENTS

| | | |
|---|---|---|
| KR | 20180025710 A | 3/2018 |
| KR | 20180044081 A | 5/2018 |
| KR | 20190011694 A | 2/2019 |
| KR | 20190043916 A | 4/2019 |
| KR | 20210020462 A | 2/2021 |

OTHER PUBLICATIONS

Written Opinion of the ISA for PCT/KR2022/017261 mailed Jan. 27, 2023, 4 pages.

* cited by examiner

| Default SW | | | |
|---|---|---|---|
| Time stamp (s) | Action | LTE B2 | NR N5 |
| 0s | Start | 21 | 19 |
| 1s | Hotsport | 21 | 19 |
| 20s | | 13~14 | -40 |
| 90s | | 21 | 19 |
| 105s | | 13-14 | -40 |

FIG. 7A

| NR Budget | | 0.5 | |
|---|---|---|---|
| Time stamp (s) | Action | LTE B2 | NR N5 |
| 0s | Start | 21 | 19 |
| 1s | Hotsport | 13~14 | 23 |
| 240s | Maintained | 13~14 | 23 |

FIG. 7B

| NR Budget | | 0.2 | |
|---|---|---|---|
| Time stamp (s) | Action | LTE B2 | NR N5 |
| 0s | Start | 21 | 19 |
| 1s | Hotsport | 21 | 19 |
| 14s | | 13 | 19 |
| 81s | | 21 | 19 |
| 91s | | 13 | 19 |
| 171s | | 21 | 19 |
| 181s | | 13 | 19 |

FIG. 7C

| NR Budget | | 0.1 | |
|---|---|---|---|
| Time stamp (s) | Action | LTE B2 | NR N5 |
| 0s | Start | 21 | 19 |
| 1s | Hotsport | 21 | 19 |
| 20s | | 13 | 16.5 |
| 90s | | 20 | 16.5 |
| 105s | | 13 | 16.5 |
| 185s | | 21 | 16.5 |
| 195s | | 13 | 16.5 |

FIG. 7D

TRANSMISSION POWER CONTROL METHOD AND ELECTRONIC DEVICE FOR PERFORMING THE SAME

CROSS-REFERENCE TO RELATED APPLICATIONS

This application is a continuation of International Application No. PCT/KR2022/017261 designating the United States, filed on Nov. 4, 2022, in the Korean Intellectual Property Receiving Office and claiming priority to Korean Patent Application No. 10-2021-0155052, filed on Nov. 11, 2021, in the Korean Intellectual Property Office, the disclosures of each of which are incorporated by reference herein in their entireties.

BACKGROUND

Field

The disclosure relates to a method of controlling transmission power and an electronic device for performing the method.

Description of Related Art

Instead of a method of limiting a specific absorption rate (SAR) not to exceed a predetermined SAR value at each moment, an electronic device applies a time averaged SAR method of limiting an average of a total value of SAR accumulated for a predetermined period of time not to exceed a predetermined SAR value. For electronic devices operating at high frequencies, a power density (PD) exposed to the human body is limited to not exceed a predetermined power density value, and for electronic devices operating at millimeter waves (mmWave), a total of the SAR and a total of the PD, or a total of sum of the SAR and the PD is limited.

Network performance and user experience may be improved based on the total amount of RF exposure absorbed by the human body according to the time averaged SAR method.

When a terminal operates in a dual connectivity band combination (ENDC) network by a time averaged specific absorption rate (SAR) method and the SAR is used up to an SAR limit, random access channel (RACH) transmission power of a new ratio (NR) tech may not generate sufficient power to be transmitted to a base station due to a power control algorithm. Accordingly, communication between the NR tech and the base station may be unstable and the NR tech may not be used in the ENDC network.

In the ENDC network, when a value of the SAR of the terminal has reached the SAR limit, total transmission power of the terminal is reduced due to the time averaged SAR method and the RACH transmission power of the NR tech may not reach the base station, which causes failure of the connection of the NR tech.

Even after the RACH of the NR tech is transmitted to the base station and successful connection is established, if an average SAR value exhausts the margin to the SAR limit, the transmission power of the NR tech may be reduced, which may generate NR radio link failure (RLF).

SUMMARY

Embodiments of the disclosure provide a transmission power control method and electronic device for transmitting RACH power, with which a first signal (e.g., a signal of NR tech) is transmitted to a base station, in the time averaged SAR method, to continuously use communication using the first signal in the ENDC network and improve transmission power performance.

Embodiments of the disclosure provide a transmission power control method and electronic device for allocating a predetermined proportion of SAR to the first signal in the ENDC network such that the first signal is transmitted with power deliverable to a first base station.

A transmission power control method according to various example embodiments includes: determining whether a size of a reference signal received from a first base station, which transmits and receives a first signal, is greater than or equal to a set size, determining a proportion of a specific absorption rate (SAR) of the first signal according to a set ratio from a total SAR margin or budget, and based on the proportion of the SAR of the first signal, transmitting the first signal.

A transmission power control method according to various example embodiments includes: determining whether a size of a first reference signal received from a first base station, which transmits and receives a first signal, is greater than or equal to a set size, identifying a frequency band, a device state index (DSI), and an antenna of a second signal to be transmitted to a second base station, based on the frequency band, the DSI, and the antenna, identifying a transmission power limit of the second signal, based on the transmission power limit, determining a ratio of an SAR of the first signal to an SAR of the second signal from a total SAR margin, and based on the ratio of the SAR of the first signal to the SAR of the second signal, transmitting the first signal and the second signal.

An electronic device according to various example embodiments includes: at least one processor, comprising processing circuitry, and a communication module comprising communication circuitry. At least one processor, individually and/or collectively, may be configured to: determine whether a size of a reference signal received from a first base station, configured to transmit and/or receive a first signal, is greater than or equal to a set size, compare a size of the first reference signal with a size of a second reference signal received from a second base station, identify a frequency band, a device state index (DSI), and an antenna of a second signal to be transmitted to the second base station, based on the frequency band, the DSI, and the antenna, identify maximum transmission power of the second signal and a transmission power limit of the second signal, and based on the transmission power limit, determine a ratio of an SAR of the first signal to an SAR of the second signal from a total SAR margin, wherein the communication module may be configured to, based on the ratio of the SAR of the first signal to the SAR of the second signal, transmit the first signal and the second signal.

According to various example embodiments disclosed herein, a network using a first signal may be connected by allocating an SAR of the first signal with a set proportion of a total SAR margin to control transmission power of the first signal to have a magnitude of power that may be transmitted to a first base station that transmits and receives the first signal.

According to various example embodiments disclosed herein, the network using the first signal may be connected by allocating a ratio of the SAR of the first signal to an SAR of a second signal in the total SAR margin using a calculated variable S or T, and transmission power performance of the electronic device may be improved by increasing the time during which maximum instantaneous power may operate.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 7A, 7B, 7C, and 7D are diagrams illustrating transmission power of a first signal and a second signal according to a proportion of an SAR of the first signal transmitted by an electronic device according to various embodiments.

DETAILED DESCRIPTION

Figure 1:
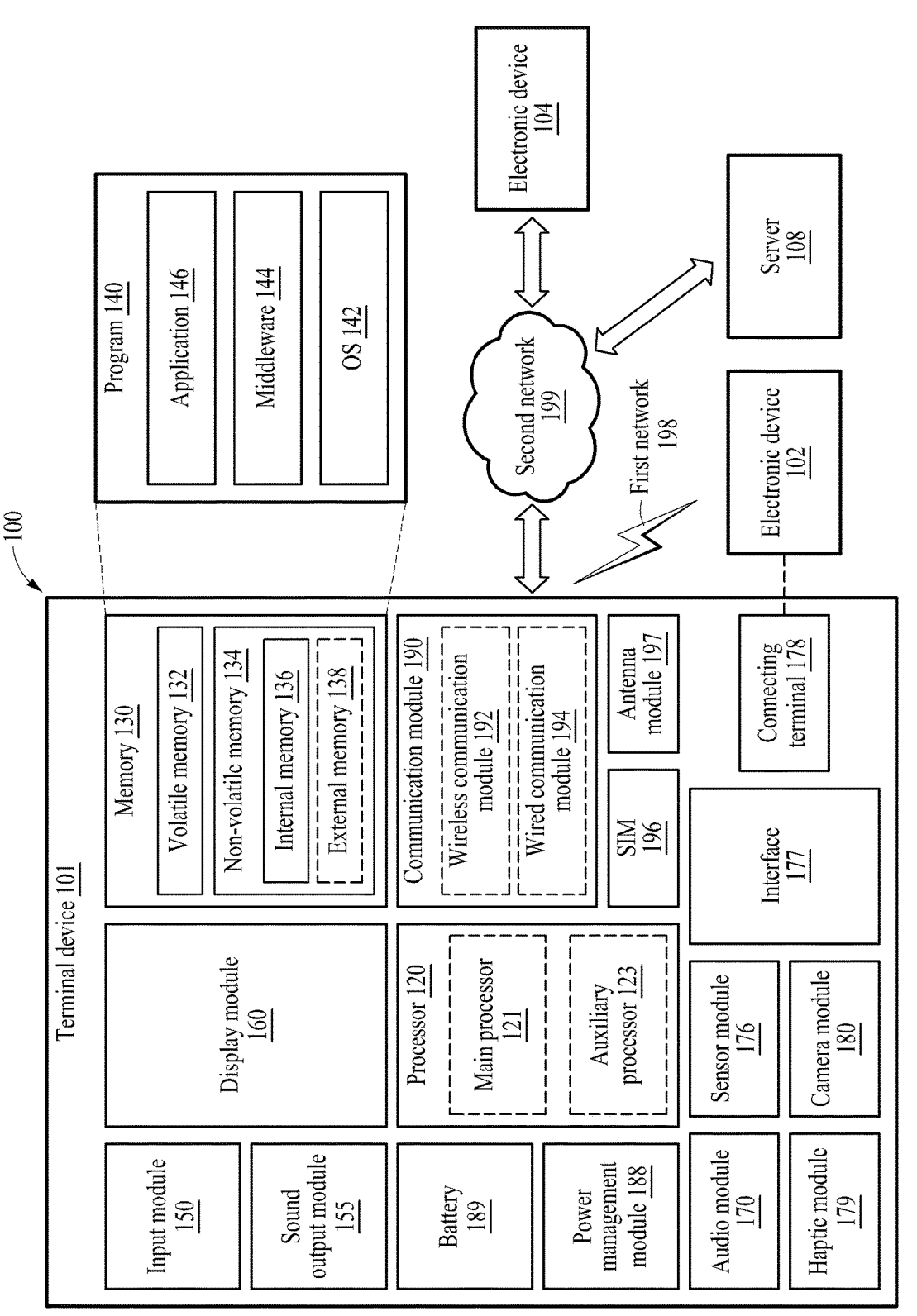
FIG. 1 is a block diagram illustrating an example electronic device in a network environment according to various embodiments.

Hereinafter, various example embodiments will be described in greater detail with reference to the accompanying drawings. When describing the various example embodiments with reference to the accompanying drawings, like reference numerals refer to like elements and any repeated description related thereto will be omitted.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence (AI) model. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mm Wave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197. According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Referring to FIGS. 2 to 9B below, a transmission power control method applied with a time averaged specific absorption rate (SAR) and an electronic device according to various embodiments will be described. Even when a power density (PD) and an SAR are limited at the same time according to a support frequency of the electronic device, a total amount of the PD and the SAR may not exceed a limit value using the transmission power control method and the electronic device substantially in the same manner.

Figure 2:
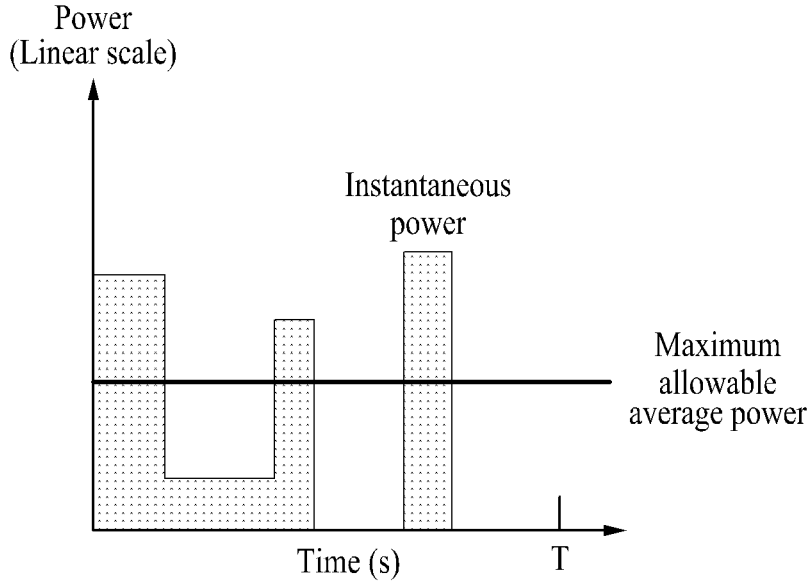
FIG. 2 is a graph illustrating a transmission power control method according to a time averaged specific absorption rate (SAR) method according to various embodiments.

FIG. 2 is a graph illustrating a transmission power control method according to a time averaged SAR method according to various embodiments.

FIG. 2 illustrates an example of a time averaged SAR algorithm and illustrates that an electronic device may transmit a signal with maximum power that an electronic device may generate at an instantaneous moment. As shown in FIG. 2, instantaneous power of a signal transmitted by the electronic device may exceed an SAR value (maximum allowable average power).

In the time averaged SAR algorithm, when an average value of total amounts of the SAR values in a predetermined time interval (time window) exceeds or is expected to exceed a predetermined SAR value, maximum instantaneous transmission power may be reduced to adjust to have average power, with which average transmission power during a predetermined period of time is allowable.

Figure 3:
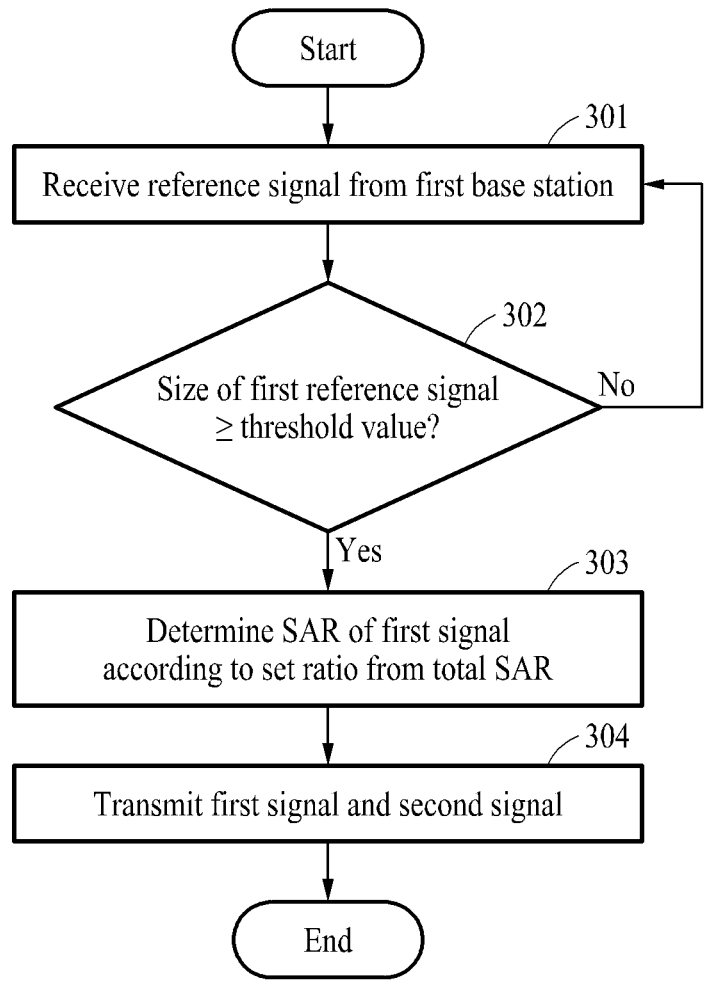
FIG. 3 is a flowchart illustrating an example operation of an electronic device determining a proportion of an SAR of a first signal according to a set ratio according to various embodiments.

FIG. 3 is a flowchart illustrating an example operation of an electronic device (e.g., the electronic device 101 of FIG. 1) determining a proportion of an SAR of a first signal according to a set ratio according to various embodiments.

The electronic device according to various embodiments may perform communication in an ENDC (dual connectivity band combination) network. For example, the electronic device may transmit and receive a first signal with a first base station and a second signal with a second base station via a communication module (e.g., the communication module 190 of FIG. 1).

For example, the communication module of the electronic device may support a new radio (NR) access technology and a long-term evolution (LTE) communication technology. For example, the first signal may be a signal using the NR access technology, and the second signal may be a signal using the LTE communication technology. For example, the electronic device may transmit and receive the first signal using the NR access technology with the first base station and transmit and receive the second signal using the LTE communication technology to the second base station.

For example, the electronic device may perform the communication by receiving a reference signal from the first base station and transmitting and receiving the first signal with the first base station, while performing the communication by transmitting and receiving the second signal with the second base station. For example, the electronic device may communicate with the first base station and the second base station using the first signal and the second signal in a non-standalone (NSA) manner. For example, the second signal may be referred to as an anchor.

In operation 301, the electronic device according to various embodiments may receive a reference signal from the first base station. The electronic device may identify a strength of the reference signal received from the first base station. For example, a size of the received reference signal may be referred to as a reference signal received power (RSRP).

In operation 302, the electronic device according to various embodiments may determine whether the size of the received reference signal is greater than or equal to a set size. For example, the set size may be a B1 threshold. For example, when the size of the reference signal received from the first base station is greater than or equal to the set size, the electronic device may communicate with the first base station.

In operation 303, when the size of the reference signal is identified to be greater than or equal to the set size in operation 302, the electronic device according to various embodiments may determine the SAR of the first signal according to a set ratio from total SAR margin. For example, when an output of an emitted signal is limited according to the time averaged SAR method, the total SAR margin may refer to an SAR remaining in a set time interval (time window).

For example, the electronic device may determine a ratio of the SAR of the first signal to the SAR of the second signal. For example, the electronic device may determine the ratio of the SAR of the first signal to the SAR of the second signal as 1:9 or 2:8. The ratio of the SAR of the first signal to the SAR of the second signal determined by the electronic device is not limited to the above examples.

According to various embodiments, in operation 304, the electronic device may transmit the first signal. For example, a magnitude of power of the first signal transmitted in operation 304 may be determined according to a proportion of the SAR of the first signal determined in operation 303. For example, when the proportion of the SAR of the first signal is determined, the SAR of the first signal may be allocated from the total SAR margin. The electronic device may transmit the first signal with the magnitude of the power of the first signal corresponding to the allocated SAR of the first signal.

For example, the electronic device may determine the ratio of the SAR of the first signal using the NR access technology to the SAR of the second signal using the LTE communication technology as 1:9. For example, the electronic device may transmit a random access channel (RACH) MSG1 to the first base station, in order to be connected to and communicate with the first base station.

The electronic device may transmit the first signal to reach the first base station by allocating the SAR of the first signal as the set ratio from the total SAR margin. For example, if the margin of the SAR is insufficient when the SAR of the first signal is not allocated, the power of the first signal transmitted by the electronic device may be insufficient to reach the first base station. The electronic device may allocate the SAR of the first signal as the set ratio so that the transmitted first signal reaches the first base station.

For example, the electronic device may transmit a message (e.g., RACH MSG1) for communication connection with the first base station according to the set proportion of the SAR of the first signal. In another example, the electronic device may transmit the first signal for communicating with the first base station according to the SAR of the first signal. For example, the electronic device may transmit the first signal or the message according to the set proportion from the total SAR margin to be connected to and communicate with the first base station using the first signal. Even when the total SAR margin is used by the second signal after the communication connection, a release (e.g., NR band radio link failure (RLF)) of the communication connection with the first base station may be prevented and/or reduced.

For example, in operation 304, the electronic device may transmit the first signal to the first base station, and transmit the second signal to the second base station. For example, the electronic device may transmit the first signal and the second signal to the first base station and the second base station, respectively, according to the NSA method in the ENDC network. For example, the electronic device may determine a proportion of the SAR of the second signal according to the set ratio from the total SAR margin, and transmit the second signal according to the proportion of the SAR of the second signal. A magnitude of power of the transmitted second signal may be determined according to the SAR of the second signal.

Figure 4:
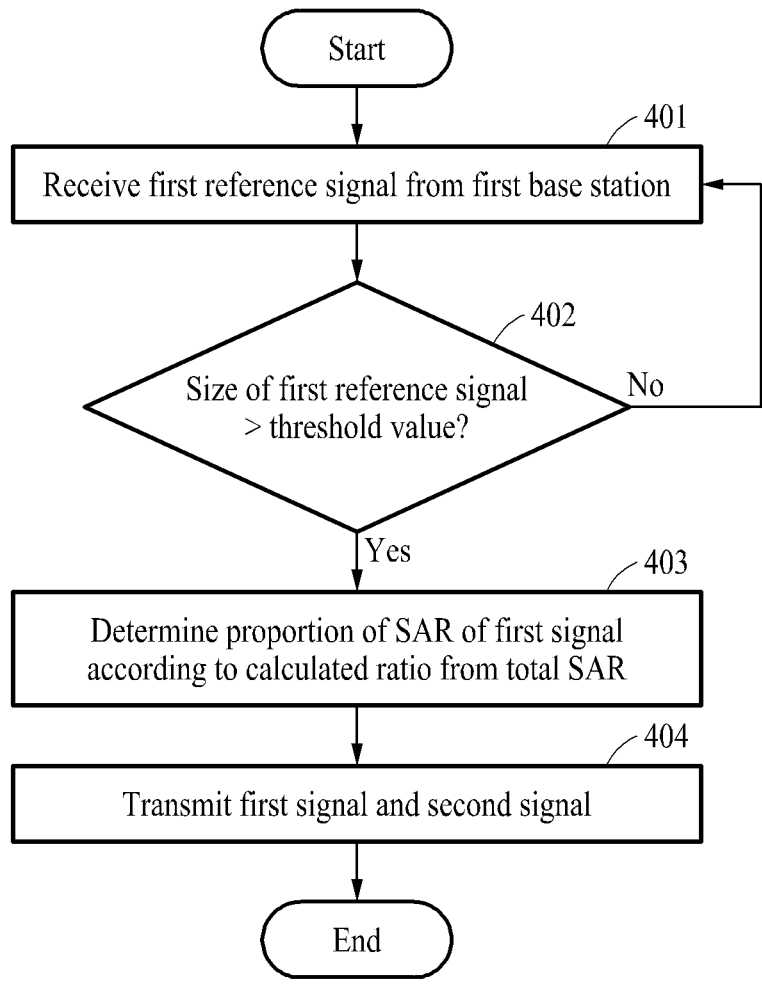
FIG. 4 is a flowchart illustrating an example operation of an electronic device determining a proportion of an SAR of a first signal according to a calculated ratio according to various embodiments.

FIG. 4 is a flowchart illustrating an example operation of an electronic device (e.g., the electronic device 101 of FIG. 1) determining a proportion of an SAR of a first signal according to a calculated ratio according to various embodiments.

Referring to FIG. 4, in operation 401, the electronic device according to various embodiments may receive a reference signal from the first base station.

The electronic device according to various embodiments may compare a size of the first reference signal with a set size. For example, in operation 402, the electronic device may determine whether the size of the first reference signal exceeds a threshold value which is the set size.

The description of operations 301 and 302 of FIG. 3 may apply to operations 401 and 402, respectively, substantially in the same manner.

In operation 403, when the size of the first reference signal exceeds the first reference signal with a set size (Yes in operation 402) the electronic device according to various embodiments may determine the proportion of the SAR of the first signal according to the calculated ratio from a total SAR margin. In operation 403, the electronic device may calculate the proportion of the SAR of the first signal from the total SAR margin.

For example, the electronic device may determine a ratio of the SAR of the first signal to the SAR of the second signal using at least one of maximum transmission power of the second signal, a transmission power limit of the second signal, or current transmission power of the second signal transmitted to the second base station. A specific operation in which the electronic device determines the ratio of the SAR of the first signal to the SAR of the second signal according to a calculation result will be described in greater detail below with reference to FIGS. 5 and 6.

For example, the electronic device may transmit the first signal and the second signal in the ENDC network. The electronic device may allocate each SAR from the total SAR margin according to the ratio of the SAR of the first signal to the SAR of the second signal determined according to the calculation result. For example, the electronic device may dynamically allocate the SARs of the first signal and the second signal according to the calculation result from the total SAR margin, thereby increasing the time during which the first signal and/or the second signal may be transmitted with maximum instantaneous power, and improving communication performance of the electronic device.

In operation 404, the electronic device according to various embodiments may transmit the first signal and the embodiments may determine the SAR of the first signal and the SAR of the second signal according to a set ratio. For example, the electronic device may determine the ratio of the SAR of the first signal to the SAR of the second signal as 1:9 or 2:8 according to the set ratio.

By comparing the size of the first reference signal and the size of the second reference signal in operation 501, the electronic device may determine whether the second signal operates in a higher electric field than the first signal. When the second signal does not operate in a higher electric field than the first signal, the electronic device may have unstable network connection of the second signal when a high proportion is allocated to the SAR of the first signal from the total SAR margin. In operation 502, when the second signal is not identified as operating in a higher electric field than the first signal, the electronic device may determine the proportion of the SAR of the first signal and the proportion of the SAR of the second signal according to the determined ratio from the total SAR margin such that the network using the first signal and the second signal is connected.

In operation 503, the electronic device according to various embodiments may identify a frequency band, a device state index (DSI), and an antenna of the second signal. In operation 504, the electronic device may identify maximum transmission power and a transmission power limit of the second signal based on the frequency band, the DSI, and the antenna of the second signal.

TABLE 1

| Tech_Band (Anchor) | DSI Antenna # | 0 (Free) TX Power LIMIT (dBm) | 1 (Grip) TX Power LIMIT (dBm) | 2 (RECEIVER) TX Power LIMIT (dBm) | 3 (HOT SPOT) TX Power LIMIT (dBm) | 4 (EAR JACK) TX Power LIMIT (dBm) | 7 (CAM ON) TX Power LIMIT (dBm) | MTPL NV_Pmax(dBm) |
|---|---|---|---|---|---|---|---|---|
| LTE_B2 | 0 | 25.7 | 18.5 | 27 | 18.5 | 18.5 | 25.7 | 28.5 |
| LTE_B5 | 0 | 10.6 | 26.8 | 27 | 26.8 | 26.8 | 30.6 | 28 |
| LTE_B7 | 1 | 27 | 20 | 35.4 | 20 | 20 | 27 | 23.5 | second signal. A magnitude of power of the first signal transmitted by the electronic device in operation 404 may be determined according to a proportion of the SAR of the first signal determined in operation 403.

Figure 5:
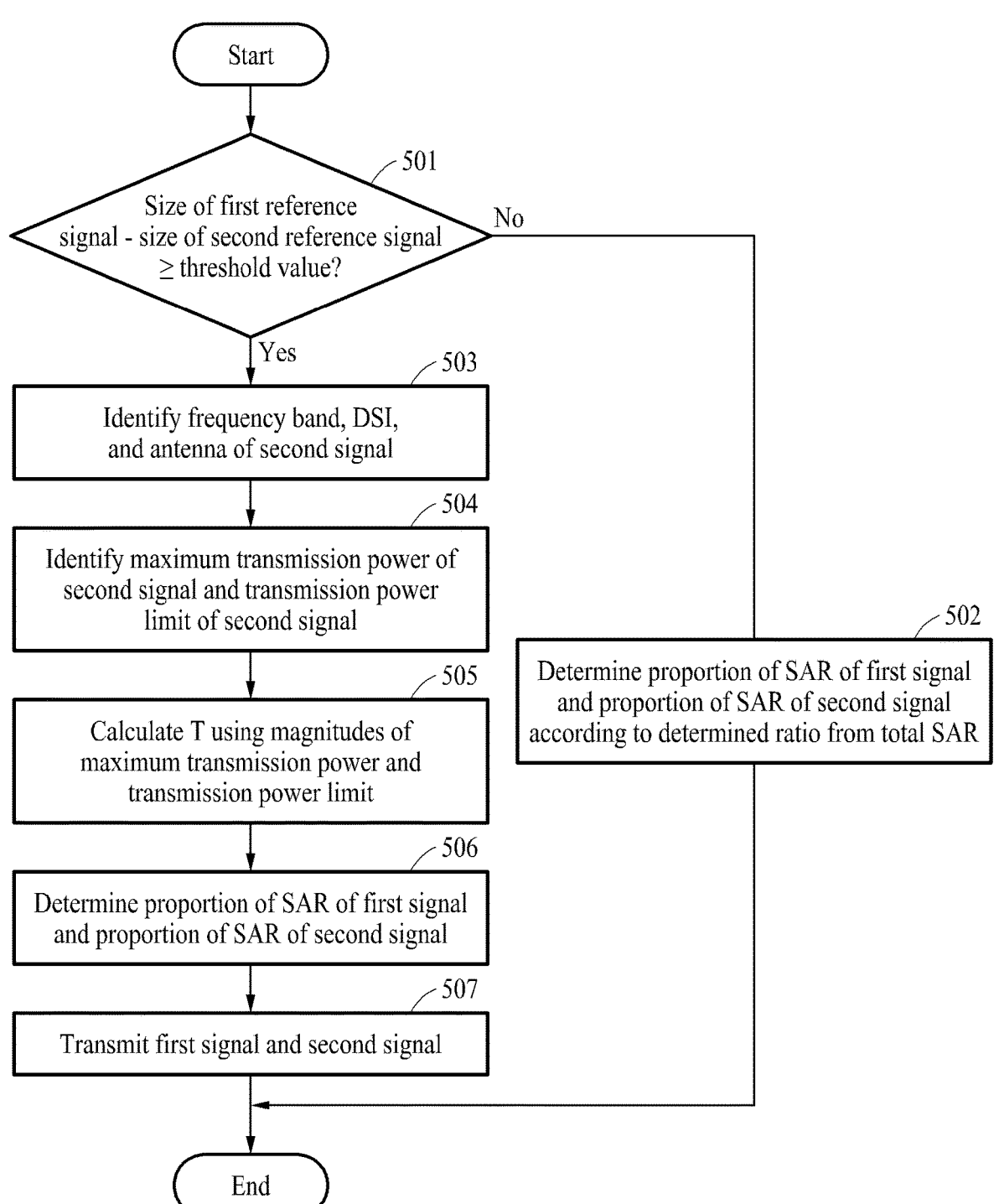
FIG. 5 is a flowchart illustrating an example operation of an electronic device determining a ratio of an SAR of a first signal to an SAR of a second signal using a variable T according to various embodiments.

FIG. 5 is a flowchart illustrating an example operation of an electronic device (e.g., the electronic device 101 of FIG. 1) determining a ratio of an SAR of a first signal to an SAR of a second signal using a variable T according to various embodiments.

For example, operations of the electronic device shown in FIG. 5 may be an example of the operation of determining the SAR of the first signal from the total SAR margin in operation 403 of FIG. 4.

In operation 501, the electronic device according to various embodiments may compare a size of a first reference signal with a size of a second reference signal. The first reference signal and the second reference signal may refer to reference signals received from the first base station and the second base station, respectively. For example, the electronic device may compare the size of the second reference signal with the size of the first reference signal to determine whether the size of the second reference signal is a magnitude greater than or equal to a threshold value (e.g., 3 dB).

In operation 502, when the size of the second reference signal is compared with the size of the first reference signal and a size obtained by subtracting the size of the first reference signal from the size of the second reference signal is not greater than or equal to the threshold value in operation 501, the electronic device according to various Table 1 shows the maximum transmission power and the transmission power limit according to the frequency band, the DSI, and the antenna of the second signal. Referring to Table 1 above, the electronic device may identify the transmission power limit of the second signal and the maximum transmission power of the second signal based on the identified frequency band, the DSI, and the antenna of the second signal.

For example, when the frequency band of the second signal is Band 2, an antenna number (antenna #) is 0, and a state of the electronic device is a state in which a hotspot connection is turned on, the transmission power limit (TX power limit) may be 18.5 dBm and the maximum transmission power (MTPL NV_Pmax) may be 23.5 dBm.

For example, the electronic device may identify the frequency band and the DSI of the second signal, and may identify a magnitude of the transmission power limit recorded in a memory. For example, the electronic device may store data (e.g., an SAR encrypting file system (EFS) file) on the transmission power limit in the memory. For example, a time averaged power limit value defined to satisfy SAR standards may be recorded in the data on transmission power limit.

Referring to FIG. 5, the electronic device according to various embodiments may determine a ratio of the SAR of the first signal to the SAR of the second signal from the total SAR margin, based on the maximum transmission power and the transmission power limit of the second signal.

For example, in operation 505, the electronic device may calculate a variable T using magnitudes of the maximum transmission power and the transmission power limit. For example, T may be calculated as shown in Equation 1 below.

$$T = P_{Max} - P_{Limit}$$ [Equation 1]

In Equation 1, $P_{Max}$ may denote the maximum transmission power of the second signal and $P_{Limit}$ may denote the transmission power limit of the second signal.

SAR of the first signal to the SAR of the second signal may be the same as the set ratio of the SAR of the first signal to the SAR of the second signal determined in operation 502.

In Table 3 above, a great value of the variable T, for example, a great difference between the maximum transmission power of the second signal and the transmission power limit of the second signal may indicate that the second signal contributes more to radio frequency (RF) exposure. For example, when the variable T is great, the electronic device may reduce the proportion of the SAR of the second

TABLE 2

| Anchor | T (Free) | T (Grip) | T (RECEIVER) | T (HOT SPOT) | T (EAR JACK) | T (CAM ON) |
|---|---|---|---|---|---|---|
| B2 | 23.5 − 25.7 = −2.2 | 23.5 − 18.5 = 5 | 23.5 − 27 = −3.5 | 23.5 − 18.5 = 5 | 23.5 − 18.5 = 5 | 23.5 − 25.7 = = −2.2 |
| B5 | 25 − 30.6 = −5.6 | 25 − 26.8 = = −1.8 | 25 − 27 = −2 | 25 − 26.8 = −1.8 | 25 − 26.8 = −1.8 | 25 − 30.6 = −5.6 |
| B7 | 23.5 − 27 = −3.5 | 23.5 − 20 = 3.5 | 23.5 − 33.4 = −9.9 | 23.5 − 20 = 3.5 | 23.5 − 20 = 3.5 | 23.5 − 27 = −3.5 |

Table 2 shows a result of calculating T by Equation 1 using the maximum transmission power and the transmission power limit of the second signal in Table 1.

In operation 506, the electronic device according to various embodiments may determine the ratio of the SAR of the first signal to the SAR of the second signal from the total SAR margin based on T.

Table 3 shows the proportion of the SAR of the first signal and the proportion of the second SAR determined by the electronic device based on T. For example, the first signal may correspond to the NR and the second signal to the LTE. For example, a budget ratio may refer to the proportion of the SAR of the first signal and the proportion of the second SAR determined from the total SAR margin.

TABLE 3

| | Budget Ratio LTE:NR |
|---|---|
| T ≤ 0 | 9:1 |
| 0 < T ≤ 3 | 8:2 |
| 3 < T ≤ 5 | 7:3 |
| T > 5 | 5:5 |

Referring to Table 3, as a difference between the maximum transmission power and the transmission power limit is great, the electronic device according to various embodiments may determine the proportion of the SAR of the first signal to be great, and determine the proportion of the SAR of the second signal to be small. From Table 3, it may be confirmed that, when T is greater than 5, the ratio of the SAR of the first signal (NR) to the SAR of the second signal (LTE) is 5:5, and when T is greater than 3 and smaller than or equal to 5, the ratio of the SAR of the first signal (NR) to the SAR of the second signal (LTE) is 3:7.

Referring to Table 3, when the difference between the maximum transmission power and the transmission power limit is smaller than or equal to a set magnitude, the electronic device according to various embodiments may determine the ratio of the SAR of the first signal to the SAR of the second signal as the set ratio. For example, in Table 3, when T is smaller than or equal to 0, the ratio of the SAR of the first signal (NR) to the SAR of the second signal (LTE) may be determined as 1:9 according to the set ratio.

For example, when the difference between the maximum transmission power and the transmission power limit is smaller than or equal to the set magnitude, the set ratio of the signal, and allocate more SAR to the proportion of the SAR of the first signal, for example, a budget of the first signal.

In Table 3 above, when the variable T is negative, for example, when the maximum transmission power of the second signal is smaller than the transmission power limit of the second signal, it may indicate that the transmission power of the second signal contributes less to the RF exposure. For example, the electronic device may determine the ratio of the SARs of the first signal to the second signal according to the set ratio by increasing the SAR of the second signal with a higher priority to increase the contribution to the maximum transmission power of the second signal.

In operation 507, the electronic device according to various embodiments may transmit the first signal and the second signal according to the determined ratio of the SARs of the first signal to the second signal. For example, power of the first signal and power of the second signal output by the electronic device may be determined according to the ratio of the SARs of the first signal to the second signal. For example, the SARs of the first signal and the second signal may be determined according to the ratio of the SARs of the first signal to the second signal from the total SAR margin, and the power of the first signal and the second signal may be determined according to the SARs of the first signal and the second signal.

Figure 6:
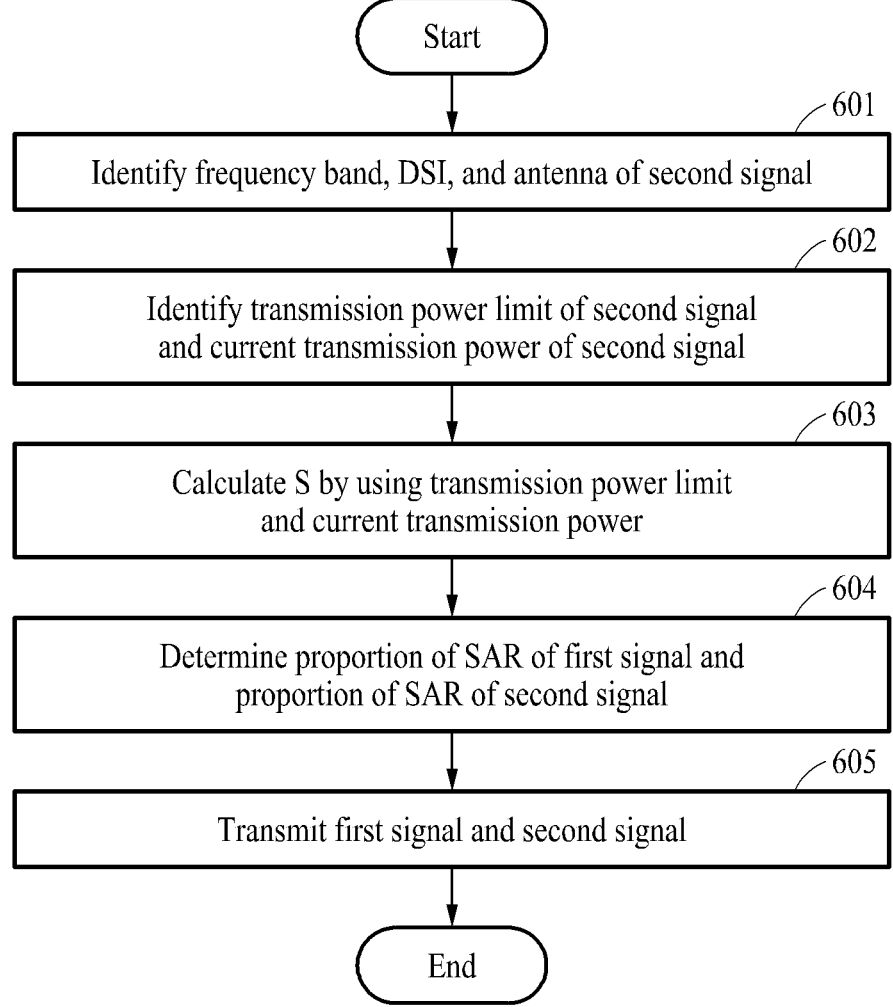
FIG. 6 is a flowchart illustrating an example operation of an electronic device determining a ratio of an SAR of a first signal to an SAR of a second signal using a variable S according to various embodiments.

FIG. 6 is a flowchart illustrating an example operation of an electronic device (e.g., the electronic device 101 of FIG. 1) determining a ratio of an SAR of a first signal to an SAR of a second signal using a variable S according to various embodiments.

For example, operations of the electronic device shown in FIG. 6 may be an example of the operation of determining the SAR of the first signal from the total SAR margin in operation 403 of FIG. 4.

In operation 601, the electronic device according to various embodiments may identify a frequency band, a DSI, and an antenna of the second signal. The description of operation 503 of FIG. 5 and Table 1 may apply to operation 601 of the electronic device substantially in the same manner.

In operation 602, the electronic device according to various embodiments may identify a transmission power limit of the second signal and current transmission power of the second signal. The operation in which the electronic device identifies the transmission power limit of the second signal in operation 602 may be understood in the same manner as the operation (e.g., operation 503 of FIG. 5) in which the electronic device identifies the transmission power limit of the second signal described with reference to Table 1. The electronic device may identify power, for example, current transmission power of the second signal to be output. For example, the electronic device may identify the current transmission power of the second signal in a communication module (e.g., the communication module 190 of FIG. 1).

Referring to FIG. 5, the electronic device according to various embodiments may determine a ratio of the SAR of the first signal to the SAR of the second signal from the total SAR margin, based on the transmission power limit and the current transmission power of the second signal.

For example, in operation 603, the electronic device may calculate a variable S using the transmission power limit and the current transmission power of the second signal. For example, S may be calculated as shown in Equation 2 below.

$$S = P_{Limit} - P_{Current} \qquad \text{[Equation 2]}$$

In Equation 2, $P_{Limit}$ may denote the transmission power limit of the second signal and $P_{Current}$ may denote the current transmission power of the second signal.

In operation 604, the electronic device according to various embodiments may determine the ratio of the SAR of the first signal to the SAR of the second signal from the total SAR margin based on S.

Table 4 shows S calculated by Equation 2 above when the frequency band of the second signal is B2 and the current transmission power of the second signal is 15 dBm in Table 1 above.

or equal to 9, the ratio of the SAR of the first signal (NR) to the SAR of the second signal (LTE) is 3:7.

Referring to Table 3, when the difference between the transmission power limit and the current transmission power is smaller than or equal to a set magnitude (e.g., 3 dBm), the electronic device according to various embodiments may determine the ratio of the SAR of the first signal to the SAR of the second signal as the set ratio. For example, in Table 5, when S is smaller than or equal to 3, the ratio of the SAR of the first signal (NR) to the SAR of the second signal (LTE) may be determined as 1:9 according to the set ratio.

In Table 3 above, when the variable S is great, for example, when the transmission power limit of the second signal is greater than the current transmission power of the second signal, the SAR allocated to the second signal may be allocated to the SAR of the first signal. For example, in a network where the second signal (e.g., LTE) operates in a high electric field, the electronic device may transmit the second signal with power lower than the transmission power limit of the second signal defined to satisfy the regulation of the SAR, to form a network. Even when the electronic device allocates the SAR allocated to the second signal to the SAR of the first signal, the network using the second signal may be stably formed.

The electronic device according to various embodiments may calculate a remaining budget of the SAR of the second signal based on the current transmission power, allocate the remaining budget of the SAR of the second signal to the SAR of the first signal, and determine the SAR of the first signal. In an example below, the proportion of the SAR of the first signal and/or the second signal may refer to a proportion in the total SAR margin, and for example, the proportion of the SAR of the second signal which is 0.5 may

TABLE 4

| Anchor | S (Free) | S (Grip) | S (RECEIVER) | S (HOT SPOT) | S (EAR JACK) | S (CAM ON) |
|---|---|---|---|---|---|---|
| B2 | 25.7 − 15 = 10.7 | 18.5 − 15 = 3.5 | 27 − 15 = 12 | 18.5 − 15 = 3.5 | 18.5 − 15 = 3.5 | 25.7 − 15 = = 10.7 |

Table 5 shows the proportion of the SAR of the first signal and the proportion of the second SAR determined by the electronic device based on S. For example, the first signal may correspond to the NR and the second signal to the LTE. For example, a budget ratio may refer to the proportion of the SAR of the first signal and the proportion of the second SAR determined from the total SAR margin.

TABLE 5

| | Budget Ratio LTE:NR |
|---|---|
| S ≤ 3 | 9:1 |
| 3 < S ≤ 6 | 8:2 |
| 6 < S ≤ 9 | 7:3 |
| S > 9 | 5:5 |

Referring to Table 5, the electronic device according to various embodiments may determine the SAR of the first signal to be great, and determine the SAR of the second signal to be small, as the transmission power limit and the current transmission power is great. From Table 5, it may be confirmed that, when S is greater than 9, the ratio of the SAR of the first signal (NR) to the SAR of the second signal (LTE) is 5:5, and when S is greater than 6 and smaller than imply that the proportion of the SAR of the second signal is 50% in the total SAR margin.

For example, the electronic device may determine a magnitude obtained by subtracting the current transmission power of the second signal from backoff power of the second signal as the remaining budget of the SAR of the second signal.

For example, the backoff power of the second signal may refer to transmission power of the second signal that is adjusted to satisfy the regulation of the SAR in a time window set according to the time averaged SAR method when the electronic device uses a plurality of radio access technologies (RATs).

For example, the electronic device may determine the SAR of the first signal by adding the remaining budget of the SAR of the second signal to the SAR of the first signal allocated to the first signal previously.

As a specific example, when reserved power of the second signal is 3 dB, the allocated SAR of the second signal may be 0.5 and the proportion of the allocated SAR of the first signal may be 0.1. The transmission power limit of the second signal may be 20 dBm, the backoff power of the second signal may be 17 dBm, the transmission power limit of the first signal may be 26 dBm, and the backoff power of the first signal may be 16 dBm.

In the above example, all of the remaining budget of the SAR of the second signal may be allocated to the SAR of the first signal. For example, when the current transmission power of the second signal is 14 dBm, the remaining budget of the SAR of the second signal may be 14 dBm, and the proportion of the SAR of the second signal may correspond to 0.5 to 0.25. The proportion of the SAR of the first signal may be calculated as 0.35 by adding 0.25, which is the remaining budget of the SAR of the second signal to 0.1, which is an original proportion. The backoff power of the first signal may be approximately 21.4 dBm.

In the above example, a portion of the remaining budget of the SAR of the second signal may correspond to the first SAR. In the above example, 0.125, which is a half of the remaining budget of the SAR of the second signal may be allocated to the SAR of the first signal, such that the proportion of the first SAR may be 0.225 and the backoff power of the first signal may be 19.5 dBm.

For example, the operation of allocating a portion of the remaining budget of the SAR of the second signal to the SAR of the first signal may be understood to be substantially the same as the operation of determining the proportions of the SARs of the first signal and the second signal according to the calculated S.

In operation 605, the electronic device according to various embodiments may transmit the first signal and the second signal according to the determined ratio of the SARs of the first signal to the second signal.

FIGS. 7A, 7B, 7C and 7D are diagrams illustrating transmission power of a first signal and a second signal according to a proportion of an SAR of the first signal transmitted by an electronic device (e.g., the electronic device 101 of FIG. 1) according to various embodiments.

FIGS. 7A, 7B, 7C and 7D (which may be referred to as FIGS. 7A to 7D) are tables showing results of comparing maximum transmission power of the first signal (NR, N5) and the second signal (Anchor, B2) in the ENDC network, when the total SAR is regulated based on the time averaged SAR method, in a situation where the SAR margin is rapidly decreasing with the hotspot of the electronic device turned on.

FIG. 7A shows a case where the proportion of the SAR of the first signal is not allocated, FIG. 7B shows a case where the proportion of the SAR of the first signal is determined as 0.5 in the total SAR, FIG. 7C shows a case where the proportion of the SAR of the first signal is determined as 0.2 in the total SAR, and FIG. 7D shows a case where the proportion of the SAR of the first signal is determined as 0.1 in the total SAR. In FIG. 7, the unit of maximum transmission power is dBm.

In FIG. 7A, when the SAR margin of the second signal (anchor) is used because there is no proportion of the SAR allocated to the first signal (NR tech) in the total SAR margin, the transmission power of the second signal is reduced, and the transmission power of the first signal is reduced to −40 dBm, the transmission power, that is difficult to communicate with the first base station.

As shown in FIG. 7D, when the proportion of even 0.1 in the total SAR margin is allocated to the SAR of the first signal (NR tech), although the power is reduced due to the exhausted total SAR margin, the first signal with 16.5 dBm that is higher power than that shown in FIG. 7A may be transmitted, thereby smoothly communicating with the first base station.

As shown in FIG. 7C, when the proportion of 0.2 in the total SAR margin is allocated to the SAR of the first signal (NR tech), the total SAR margin is exhausted faster than a case of allocating the proportion of 0.1, however, the first signal with high power may be transmitted. It may be confirmed that the transmission power of the first signal and the second signal is reduced at the time of 20 seconds in FIG. 7D, and the transmission power of the first signal and the second signal is reduced at the time of 14 seconds in FIG. 7C. It may be confirmed that the transmission power of the first signal is 19 dBm in FIG. 7C, and the transmission power of the first signal is reduced from 19 dBm to 16.5 dBm in FIG. 7D.

In FIG. 7B, it may be confirmed that the total SAR margin is rapidly consumed so that the transmission power of the second signal is reduced to 13 to 14 dBm at the time of 1 second, however, the transmission power of the second signal is maintained high at 23 dBm.

As shown in FIG. 7A to FIG. 7D, the electronic device may determine the proportion of the SAR of the first signal in the total SAR margin, and when the first signal is transmitted according to the determined proportion, the transmission power of the first signal secures the power to reach the first base station, and operates under the conditions based on the time averaged SAR method.

FIGS. 8A, 8B, 9A, and 9B are graphs illustrating SAR margins and transmission power according to a ratio of an SAR of a first signal to an SAR of a second signal transmitted by an electronic device (e.g., the electronic device 101 of FIG. 1) according to various embodiments.

Figure 8A:
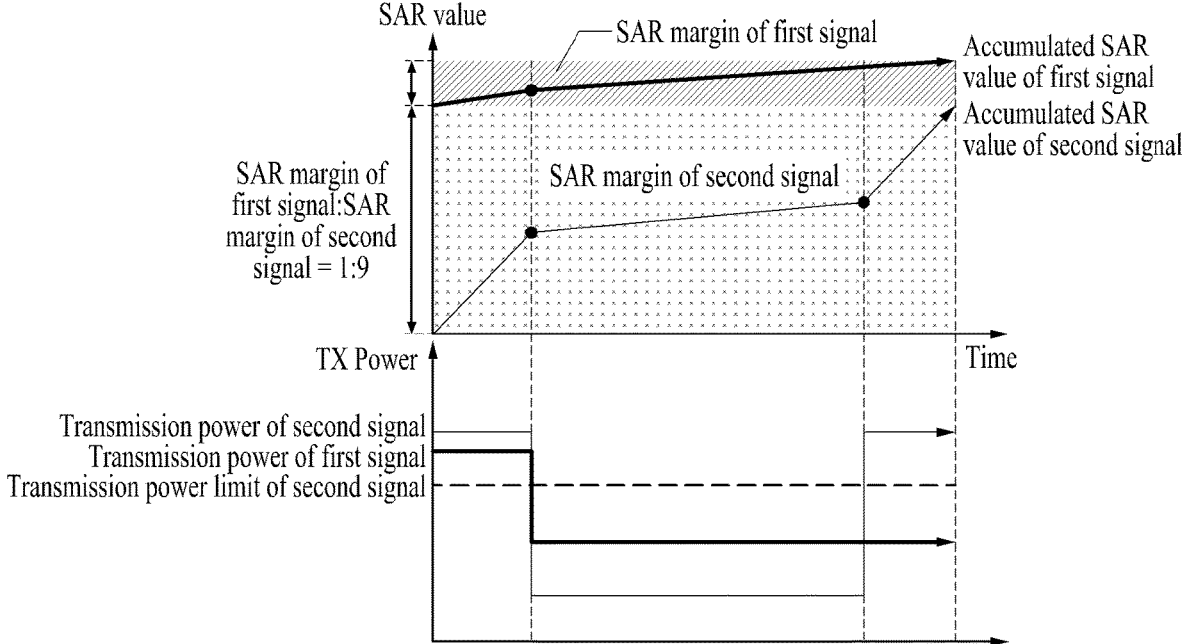
FIGS. 8A, 8B, 9A, and 9B are graphs illustrating SAR margins and transmission power according to a ratio of an SAR of a first signal to an SAR of a second signal transmitted by an electronic device according to various embodiments.
Figure 8B:
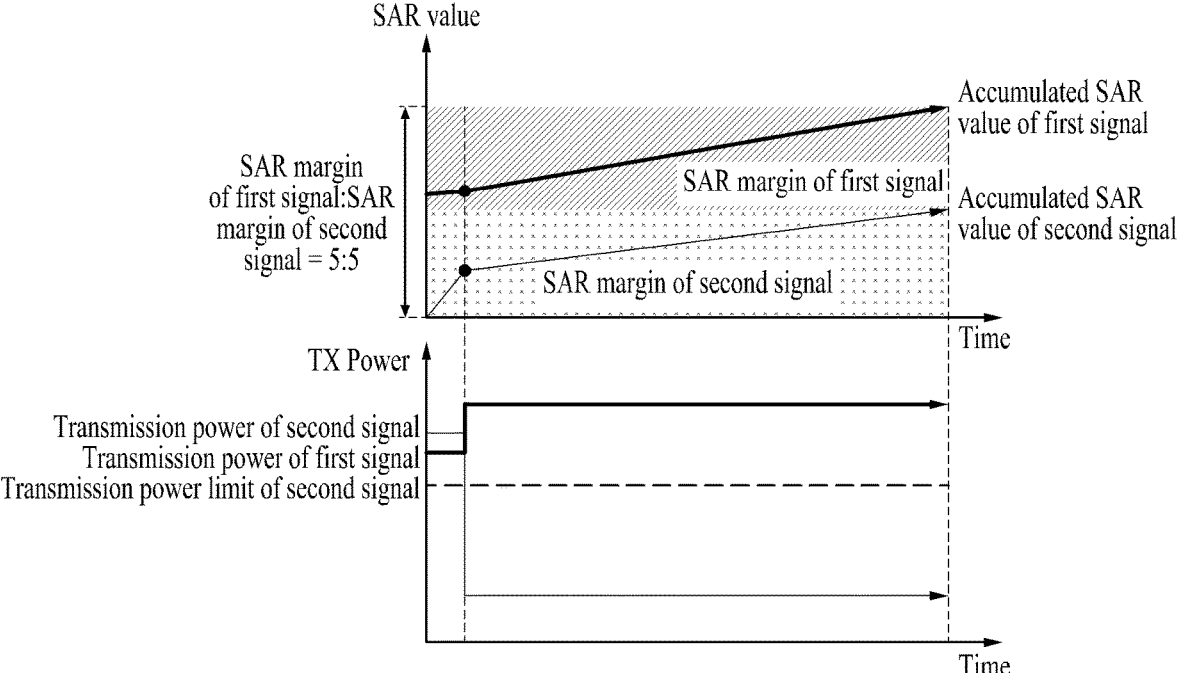

FIG. 8A is a graph illustrating the SAR margins and the transmission power of the first signal and the second signal when the ratio of the SARs of the first signal to the second signal is 1:9, and FIG. 8B is a graph illustrating the SAR margins and the transmission power of the first signal and the second signal when the ratio of the SARs of the first signal to the second signal is 5:5.

Referring to FIGS. 8A and 8B, it may be confirmed that, the time during which each of the first signal and the second signal maintains the maximum power when the ratio of the SARs of the first signal to the second signal is 5:5 is increased compared to a case where the ratio of the SARs of the first signal to the second signal is 1:9. In FIG. 8A, the first signal has relatively short time for maintaining the maximum power due to the proportion of the second signal in the total SAR margin, however, in FIG. 8B, it may be confirmed that the maximum output maintaining time of the first signal is increased. For example, the electronic device may determine and allocate the proportions of the SARs of the first signal and the second signal to increase the transmission power performance of the electronic device.

For example, a high value of the calculated T may imply that, when the second signal (e.g., LTE TX) is transmitted, the SAR margin is rapidly consumed, and a slope of the SAR margin of the second signal is large.

For example, it may be confirmed that, when the value of the calculated T is high, the electronic device may reduce the proportion of the SAR margin of the second signal, and increase the proportion of the SAR of the first signal to further increase the transmission power of the first signal and the second signal.

For example, when the size of the second reference signal is greater than the size of the first reference signal by a threshold value or more, for example, in a reception electric field in which the second signal is higher than the first signal, the electronic device may determine the ratio of the SARs of the first signal to the second signal according to the calculated T, to allocate the SAR margin of the second signal operating as the anchor to the first signal, and minimize and/or reduce the power change of the anchor.

Figure 9A:
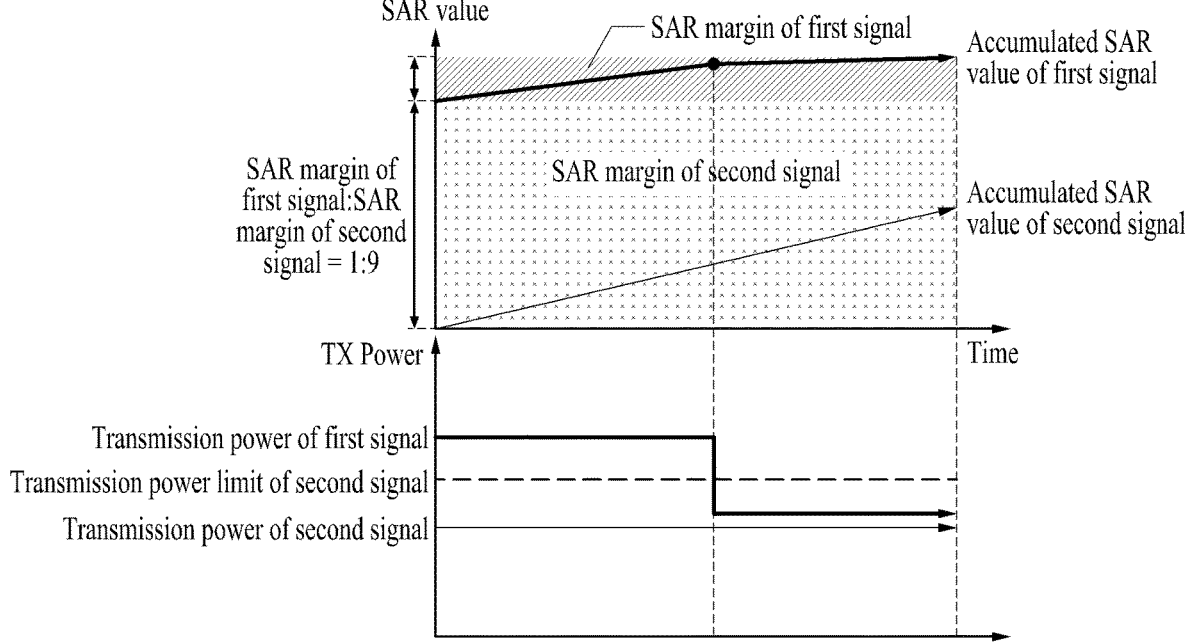
Figure 9B:
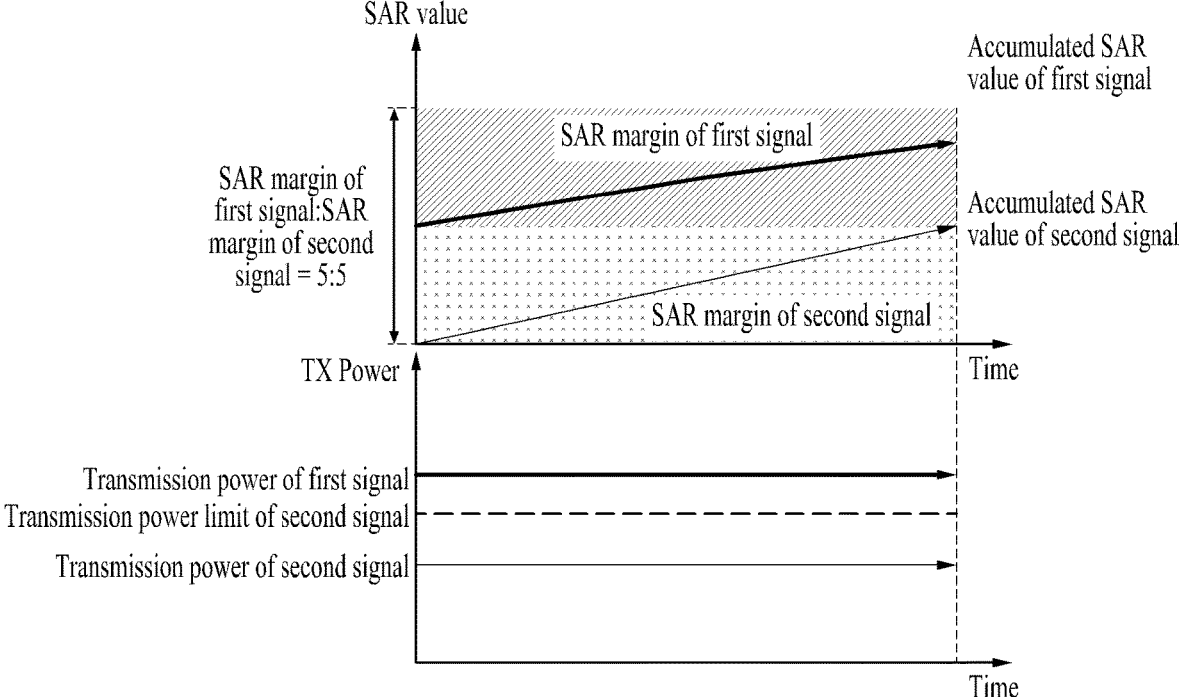

FIG. 9A and FIG. 9B are graphs illustrating the SAR margins and the transmission power of the first signal and the second signal according to the ratio of the SAR when the power of the second signal (e.g., LTE) is low. FIG. 9A is a graph illustrating the SAR margins and the transmission power of the first signal and the second signal when the ratio of the SARs of the first signal to the second signal is 1:9, and FIG. 9B is a graph illustrating the SAR margins and the transmission power of the first signal and the second signal when the ratio of the SARs of the first signal to the second signal is 5:5.

Referring to FIG. 9A, when the current transmission power of the second signal is low and the ratio of the SARs of the first signal to the second signal is 1:9, all the SAR margin allocated to the second signal may not be exhausted.

As shown in FIG. 9B, when the current transmission power of the second signal is low and the electronic device determines the ratio of the SARs of the first signal to the second signal as 5:5, backoff does not occur in both of the first signal and the second signal, and the transmission power is maintained, thereby improving the transmission power performance.

For example, in the network where the first signal (e.g., NR) operates in a weak electric field and the second signal (e.g., LTE) operates in a strong electric field, or in a situation where the current transmission power of the second signal is set to be low due to reasons such as DSI, antenna performance, and performance in each band, the electronic device may determine the ratio of the SARs of the first signal to the second signal according to the variable S, to improve the transmission power performance. As shown in FIG. 9, the time during which the first signal and the second signal transmitted by the electronic device maintain maximum outputs may be increased.

For example, the electronic device may calculate the variable S in real time using the transmission power limit of the second signal and the current transmission power of the second signal, and determine the ratio of the SARs of the first signal to the second signal according to the S calculated in real time.

A transmission power control method according to an example embodiment includes: determining whether a size of a reference signal received from a first base station, which transmits and receives a first signal, is greater than or equal to a set size, determining a proportion of an SAR of the first signal according to a set ratio from a total SAR margin, and based on the proportion of the SAR of the first signal, transmitting the first signal.

The transmission power control method according to an example embodiment may further include: determining a proportion of an SAR of a second signal according to the set ratio from the total SAR margin, and based on the proportion of the SAR of the second signal, transmitting the second signal.

A transmission power control method according to an example embodiment includes: determining whether a size of a first reference signal received from a first base station, which transmits and receives a first signal, is greater than or equal to a set size, identifying a frequency band, a DSI, and an antenna of a second signal to be transmitted to a second base station, based on the frequency band, the DSI, and the antenna, identifying a transmission power limit of the second signal, and based on the transmission power limit, determining a ratio of an SAR of the first signal to an SAR of the second signal from a total SAR margin, and based on the ratio of the SAR of the first signal to the SAR of the second signal, transmitting the first signal and the second signal.

The transmission power control method according to an example embodiment may further include: comparing a size of the first reference signal with a size of a second reference signal received from the second base station. The determining of the ratio may include, based on the frequency band, the DSI, and the antenna, identifying maximum transmission power of the second signal, and based on the maximum transmission power and the transmission power limit, determining the ratio of the SAR of the first signal to the SAR of the second signal from the total SAR margin.

The determining of the ratio according to an example embodiment may include, based on a difference between the maximum transmission power and the transmission power limit being greater than a threshold, determining a proportion of the SAR of the first signal to be great, and determining a proportion of the SAR of the second signal to be small.

The determining of the ratio according to an example embodiment may include, based on a difference between the maximum transmission power and the transmission power limit being less than or equal to a set magnitude, determining the ratio of the SAR of the first signal to the SAR of the second signal as a set ratio.

The determining of the ratio according to an example embodiment may include, based on a size obtained by subtracting a size of the first reference signal from a size of the second reference signal being less than or equal to a set size, determining the ratio of the SAR of the first signal to the SAR of the second signal as a set ratio.

The transmission power control method according to an example embodiment may further include identifying current transmission power of the second signal. The determining of the ratio may include, based on the transmission power limit and the current transmission power, determining the ratio of the SAR of the first signal to the SAR of the second signal from the total SAR margin.

The determining of the ratio according to an example embodiment may include, based on a difference between the transmission power limit and the current transmission power being greater than a threshold, determining a proportion of the SAR of the first signal to be great, and determining a proportion of the SAR of the second signal to be small.

The determining of the ratio according to an example embodiment may include, based on a magnitude obtained by subtracting a magnitude of the current transmission power from a magnitude of the transmission power limit being less than or equal to a set magnitude, determining the ratio of the SAR of the first signal to the SAR of the second signal as a set ratio.

The determining of the ratio according to an example embodiment may include, based on the current transmission power, calculating a remaining budget of the SAR of the second signal, and determining the SAR of the first signal by allocating the remaining budget of the SAR of the second signal to the SAR of the first signal.

An electronic device according to various example embodiments includes: at least one processor, comprising processing circuitry, and a communication module comprising communication circuitry, wherein at least one processor, individually and/or collectively, is configured to: determine whether a size of a first reference signal received from a first base station, configured to transmit and/or receive a first signal, is greater than or equal to a set size, identify a frequency band, a device state index (DSI), and an antenna of a second signal to be transmitted to a second base station, based on the frequency band, the DSI, and the antenna, identify a transmission power limit of the second signal, and based on the transmission power limit, determine a ratio of an SAR of the first signal to an SAR of the second signal from a total SAR margin, wherein the communication module is configured to, based on the ratio of the SAR of the first signal to the SAR of the second signal, transmit the first signal and the second signal.

At least one processor, according to an example embodiment, individually and/or collectively, may be configured to: compare a size of the first reference signal with a size of a second reference signal received from the second base station, based on the frequency band, the DSI, and the antenna, identify maximum transmission power of the second signal, and based on the maximum transmission power and the transmission power limit, determine the ratio of the SAR of the first signal to the SAR of the second signal from the total SAR margin.

At least one processor according to an example embodiment, individually and/or collectively, may be configured to, based on a difference between the maximum transmission power and the transmission power limit being greater than a threshold, determine a proportion of the SAR of the first signal to be great, and determine a proportion of the SAR of the second signal to be small.

At least one processor according to an example embodiment, individually and/or collectively, may be configured to, based on a difference between the maximum transmission power and the transmission power limit being less than or equal to a set magnitude, determine the ratio of the SAR of the first signal to the SAR of the second signal as a set ratio.

At least one processor according to an example embodiment, individually and/or collectively, may be configured to, based on a size obtained by subtracting a size of the first reference signal from a size of the second reference signal being less than or equal to the set size, determine the ratio of the SAR of the first signal to the SAR of the second signal as a set ratio.

At least one processor according to an example embodiment, individually and/or collectively, may be configured to: identify current transmission power of the second signal, and based on the transmission power limit and the current transmission power, determine the ratio of the SAR of the first signal to the SAR of the second signal from the total SAR margin.

At least one processor according to an example embodiment, individually and/or collectively, may be configured to, based on a difference between the transmission power limit and the current transmission power being greater than a threshold, determine a proportion of the SAR of the first signal to be great, and determine a proportion of the SAR of the second signal to be small.

At least one processor according to an example embodiment, individually and/or collectively, may be configured to, based on a magnitude obtained by subtracting a magnitude of the current transmission power from a magnitude of the transmission power limit being less than or equal to a set magnitude, determine the ratio of the SAR of the first signal to the SAR of the second signal as a set ratio.

The processor according to an example embodiment, individually and/or collectively, may be configured to, based on the current transmission power, calculate a remaining budget of the SAR of the second signal, and determine the SAR of the first signal by allocating the remaining budget of the SAR of the second signal to the SAR of the first signal.

The electronic device according to embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1st," and "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
at least one processor, comprising processing circuitry; and
a communication module comprising communication circuitry,
wherein at least one processor, individually and/or collectively, is configured to:
determine whether a size of a first reference signal received from a first base station configured to transmit and/or receive a first signal, is greater than or equal to a set size;
identify a frequency band, a device state index (DSI), and an antenna of a second signal to be transmitted to a second base station;
based on the frequency band, the DSI, and the antenna, identify a transmission power limit of the second signal; and
based on the transmission power limit, determine a ratio of a specific absorption rate (SAR) of the first signal to a SAR of the second signal from a total SAR margin, and
wherein the communication module is configured to, based on the ratio of the SAR of the first signal to the SAR of the second signal, transmit the first signal and the second signal.

2. The electronic device of claim 1, wherein at least one processor, individually and/or collectively, is configured to:
compare the size of the first reference signal with a size of a second reference signal received from the second base station;
based on the frequency band, the DSI, and the antenna, identify maximum transmission power of the second signal; and
based on the maximum transmission power and the transmission power limit, determine the ratio of the SAR of the first signal to the SAR of the second signal from the total SAR margin.

3. The electronic device of claim 2, wherein at least one processor, individually and/or collectively, is configured to, based on a difference between the maximum transmission power and the transmission power limit being greater than a threshold, determine a proportion of the SAR of the first signal to be great, and determine a proportion of the SAR of the second signal to be small.

4. The electronic device of claim 2, wherein at least one processor, individually and/or collectively, is configured to, based on a difference between the maximum transmission power and the transmission power limit being less than or equal to a set magnitude, determine the ratio of the SAR of the first signal to the SAR of the second signal as a set ratio.

5. The electronic device of claim 2, wherein at least one processor, individually and/or collectively, is configured to, based on a size obtained by subtracting the size of the first reference signal from the size of the second reference signal being less than or equal to the set size, determine the ratio of the SAR of the first signal to the SAR of the second signal as a set ratio.

6. The electronic device of claim 1, wherein at least one processor, individually and/or collectively, is configured to:
identify current transmission power of the second signal, and based on the transmission power limit and the current transmission power, determine the ratio of the SAR of the first signal to the SAR of the second signal from the total SAR margin.

7. The electronic device of claim 6, wherein at least one processor, individually and/or collectively, is configured to, based on a difference between the transmission power limit and the current transmission power being greater than a threshold, determine a proportion of the SAR of the first signal to be great, and determine a proportion of the SAR of the second signal to be small.

8. The electronic device of claim 6, wherein at least one processor, individually and/or collectively, is configured to, based on a magnitude obtained by subtracting a magnitude of the current transmission power from a magnitude of the transmission power limit being less than or equal to a set magnitude, determine the ratio of the SAR of the first signal to the SAR of the second signal as a set ratio.

9. The electronic device of claim 6, wherein at least one processor, individually and/or collectively, is configured to, based on the current transmission power, calculate a remaining budget of the SAR of the second signal, and determine the SAR of the first signal by allocating the remaining budget of the SAR of the second signal to the SAR of the first signal.

10. A method of controlling transmission power comprising:
determining whether a size of a reference signal received from a first base station, which transmits and receives a first signal, is greater than or equal to a set size;

determining a proportion of a specific absorption rate (SAR) of the first signal according to a set ratio from a total SAR margin; and based on the proportion of the SAR of the first signal, transmitting the first signal.

11. The method of claim 10, further comprising:

determining a proportion of a SAR of a second signal according to the set ratio from the total SAR margin; and based on the proportion of the SAR of the second signal, transmitting the second signal.

12. A method of controlling transmission power comprising:

determining whether a size of a first reference signal received from a first base station, which transmits and receives a first signal, is greater than or equal to a set size;

identifying a frequency band, a device state index (DSI), and an antenna of a second signal to be transmitted to a second base station;

based on the frequency band, the DSI, and the antenna, identifying a transmission power limit of the second signal;

based on the transmission power limit, determining a ratio of a specific absorption rate (SAR) of the first signal to a SAR of the second signal from a total SAR margin; and based on the ratio of the SAR of the first signal to the SAR of the second signal, transmitting the first signal and the second signal.

13. The method of claim 12, further comprising:

comparing the size of the first reference signal with a size of a second reference signal received from the second base station, wherein the determining of the ratio comprises:

based on the frequency band, the DSI, and the antenna, identifying maximum transmission power of the second signal; and based on the maximum transmission power and the transmission power limit, determining the ratio of the SAR of the first signal to the SAR of the second signal from the total SAR margin.

14. The method of claim 13, wherein the determining of the ratio comprises, based on a size obtained by subtracting the size of the first reference signal from the size of the second reference signal being less than or equal to the set size, determining the ratio of the SAR of the first signal to the SAR of the second signal as a set ratio.

15. The method of claim 12, further comprising:

identifying current transmission power of the second signal, wherein the determining of the ratio comprises, based on the transmission power limit and the current transmission power, determining the ratio of the SAR of the first signal to the SAR of the second signal from the total SAR margin.

* * * * *